UNITED STATES PATENT OFFICE.

JOSEPH A. SEWALL, OF NORMAL, ILLINOIS.

IMPROVEMENT IN COMPOUNDS FOR COATING IRON.

Specification forming part of Letters Patent No. 118,397, dated August 22, 1871.

*To all whom it may concern:*

Be it known that I, JOSEPH A. SEWALL, of Normal, in the county of McLean and State of Illinois, have invented a new and useful Chemical Compound for the Preservation of Iron and other Metals and Materials from Deterioration and Decay; and I do hereby declare that the following is a full, clear, and exact description thereof.

The nature of my invention consists in the making of a chemical compound that, applied to the surface of iron or other metals, wood, or other materials that are to be exposed to the air, earth, or water, will preserve such metals and materials from deterioration and decay.

My compound is composed of coal-tar, sulphur, plumbago, and carbonate of lime in about the following proportions: Two pounds of coal-tar; eight ounces of sulphur; two ounces of plumbago; one ounce of carbonate of lime.

The tar and sulphur are heated to about 480° Fahrenheit, and the plumbago and carbonate of lime then added. The compound is stirred thoroughly until well mixed, when it is ready for use.

This compound may be applied, by a brush or otherwise, to gas-pipes, water-pipes, sewer-pipes, metallic culverts, and sewerage tunnels, or any other perishable substance or material, to protect and preserve the same from corrosion and decay. It is adhesive and insoluble.

I do not confine myself to the precise proportions of the ingredients herein mentioned, as they may perhaps be varied and still answer the same purpose.

Having thus fully described my invention, what I claim as new, and desire to secure by Letters Patent, is—

The within-described compound, consisting of coal-tar, sulphur, plumbago, and carbonate of lime, and used for the purposes set forth.

JOSEPH A. SEWALL.

Witnesses:
W. M. HATCH,
THOS. SLADE.